United States Patent
Rees et al.

(10) Patent No.: US 9,410,026 B1
(45) Date of Patent: Aug. 9, 2016

(54) REBOND POLYURETHANE FOAM COMPRISING RECLAIMED CARPET MATERIAL AND METHODS FOR THE MANUFACTURE OF SAME

(75) Inventors: John J. M. Rees, Chattanooga, TN (US); Gregory Fowler, Rocky Face, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 12/786,044

(22) Filed: May 24, 2010

Related U.S. Application Data (60) Provisional application No. 61/180,706, filed on May 22, 2009.

(51) Int. Cl.
| | |
|---|---|
| *C08J 11/04* | (2006.01) |
| *C08G 18/00* | (2006.01) |
| *C08K 9/08* | (2006.01) |
| *C08J 9/36* | (2006.01) |

(52) U.S. Cl.
CPC .................. *C08J 11/04* (2013.01); *C08G 18/00* (2013.01); *C08J 9/36* (2013.01); *C08K 9/08* (2013.01)

(58) Field of Classification Search
CPC ...... C08L 2226/14; C08L 75/04; C08J 11/04; C08J 11/06; C08J 9/36; C08K 9/08
USPC ........ 521/40, 40.5, 41, 46, 48, 49, 49.5, 49.8, 521/50, 53, 54, 55, 59, 137, 172; 528/44, 528/271, 272, 310, 328, 367, 480, 491, 528/502 R; 428/95, 96, 97
See application file for complete search history.

(56) References Cited

U.S. PATENT DOCUMENTS

| | | |
|---|---|---|
| 3,497,414 A | 2/1970 | Blue et al. |
| 3,526,556 A | 9/1970 | Berner et al. |
| 3,591,444 A | 7/1971 | Hoppe et al. |
| 3,600,261 A | 8/1971 | Kerres et al. |
| 3,607,999 A | 9/1971 | Corbett et al. |
| 3,616,029 A | 10/1971 | Lerman |
| 3,630,813 A | 12/1971 | Allen |
| 3,650,867 A | 3/1972 | Bauer |
| 3,661,674 A | 5/1972 | Higgs et al. |
| 3,661,691 A | 5/1972 | Slosberg |

(Continued)

FOREIGN PATENT DOCUMENTS

| | | |
|---|---|---|
| DE | 4212757 A1 | 10/1992 |
| EP | 0135595 A1 | 4/1985 |

(Continued)

OTHER PUBLICATIONS

Response to Final Office Action filed on Jul. 13, 2015 with the United States Patent and Trademark Office for U.S. Appl. No. 12/786,047, filed May 24, 2010 (Inventor—Rees; Applicant—Columbia Insurance Co.) (8 pages).

(Continued)

*Primary Examiner* — Frances Tischler
(74) *Attorney, Agent, or Firm* — Ballard Spahr LLP (57) ABSTRACT

Disclosed are rebond polyurethane foams comprised of a plurality of polyurethane foam particles bound together to form a matrix. Reclaimed carpet material is distributed within the matrix of foam particles as a filler material. Also disclosed are methods for the manufacture of the rebond polyurethane foams disclosed herein.

9 Claims, 4 Drawing Sheets

(56) References Cited

U.S. PATENT DOCUMENTS

| | | |
|---|---|---|
| 3,686,046 A | 8/1972 | Crowley et al. |
| 3,717,597 A | 2/1973 | Hesskamp et al. |
| 3,746,610 A | 7/1973 | Hoegger |
| 3,817,817 A | 6/1974 | Pickens et al. |
| 3,821,065 A | 6/1974 | Copeland |
| 3,834,978 A | 9/1974 | Green et al. |
| 3,894,973 A | 7/1975 | Yunan |
| 3,917,774 A | 11/1975 | Sagane et al. |
| 3,922,454 A | 11/1975 | Roecker |
| 3,951,717 A | 4/1976 | Herweg et al. |
| 3,952,126 A | 4/1976 | Dycks |
| 4,014,826 A | 3/1977 | Yunan |
| 4,082,703 A | 4/1978 | Duffy et al. |
| 4,185,146 A | 1/1980 | Burke |
| 4,243,617 A | 1/1981 | Burge |
| 4,255,372 A | 3/1981 | Kuhnel et al. |
| 4,269,889 A | 5/1981 | Takagi |
| 4,296,054 A | 10/1981 | Takagi |
| 4,330,494 A | 5/1982 | Iwata et al. |
| 4,342,802 A | 8/1982 | Pickens, Jr. et al. |
| 4,417,932 A | 11/1983 | Breitscheidel et al. |
| 4,438,221 A * | 3/1984 | Fracalossi et al. .............. 521/55 |
| 4,443,286 A | 4/1984 | Ikeda et al. |
| 4,579,764 A | 4/1986 | Peoples, Jr. et al. |
| 4,594,284 A | 6/1986 | Nakagawa et al. |
| 4,683,246 A | 7/1987 | Davis et al. |
| 4,827,817 A | 5/1989 | Grohoski et al. |
| 4,836,871 A | 6/1989 | Kato |
| 4,923,547 A | 5/1990 | Yamaji et al. |
| 5,045,389 A | 9/1991 | Campagna |
| 5,104,693 A | 4/1992 | Jenkines |
| 5,108,691 A | 4/1992 | Elliott |
| 5,175,046 A | 12/1992 | Nguyen |
| 5,175,194 A | 12/1992 | Ward et al. |
| 5,178,193 A | 1/1993 | Sato et al. |
| 5,182,162 A | 1/1993 | Andrusko |
| 5,240,530 A | 8/1993 | Fink |
| 5,251,543 A | 10/1993 | Brothers |
| 5,258,085 A | 11/1993 | Breitscheidel et al. |
| 5,286,321 A | 2/1994 | Fuss |
| 5,290,818 A | 3/1994 | Nafziger et al. |
| 5,294,384 A | 3/1994 | David et al. |
| 5,312,888 A | 5/1994 | Nafziger et al. |
| 5,494,628 A | 2/1996 | Beyer et al. |
| 5,494,723 A | 2/1996 | Erren et al. |
| 5,534,208 A | 7/1996 | Barr et al. |
| 5,540,968 A | 7/1996 | Higgins |
| 5,585,185 A | 12/1996 | Smith et al. |
| 5,610,207 A | 3/1997 | de Simone et al. |
| 5,695,133 A | 12/1997 | Morse, Jr. et al. |
| 5,695,865 A | 12/1997 | Shimizu |
| 5,817,703 A | 10/1998 | Blair et al. |
| 5,869,173 A | 2/1999 | Zheng et al. |
| 5,880,165 A | 3/1999 | Triolo et al. |
| 6,130,261 A | 10/2000 | Harfmann |
| 6,133,172 A | 10/2000 | Sevenish et al. |
| 6,136,870 A | 10/2000 | Triolo et al. |
| 6,206,669 B1 | 3/2001 | Lewit et al. |
| 6,235,391 B1 | 5/2001 | Contreras et al. |
| 6,241,168 B1 | 6/2001 | Young et al. |
| 6,269,724 B1 | 8/2001 | Sabatelli et al. |
| 6,316,075 B1 | 11/2001 | Desai et al. |
| 6,344,254 B1 | 2/2002 | Smith et al. |
| 6,378,179 B1 | 4/2002 | Hirsch |
| 6,503,595 B1 | 1/2003 | Kim et al. |
| 6,623,676 B1 | 9/2003 | Davis et al. |
| 6,716,890 B1 | 4/2004 | Niederoest et al. |
| 6,794,009 B1 | 9/2004 | Brodeur, Jr. et al. |
| 6,872,445 B2 | 3/2005 | Vinod |
| 6,884,837 B2 | 4/2005 | Kohlhammer et al. |
| 7,022,751 B2 * | 4/2006 | Zhang et al. .................. 523/206 |
| 7,045,590 B2 | 5/2006 | Bell |
| 7,056,567 B2 | 6/2006 | O'Neill et al. |
| 7,144,534 B2 | 12/2006 | Buchel et al. |
| 7,207,744 B2 | 4/2007 | Jones, IV et al. |
| 7,264,854 B2 | 9/2007 | Stroppiana |
| 7,279,058 B2 | 10/2007 | Morgan |
| 7,279,065 B1 | 10/2007 | Ogle et al. |
| 7,514,026 B1 | 4/2009 | Zafiroglu |
| 2002/0092634 A1 | 7/2002 | Rokman et al. |
| 2002/0124366 A1 | 9/2002 | Hirsch |
| 2002/0132085 A1 | 9/2002 | Higgins et al. |
| 2003/0072911 A1 | 4/2003 | Higgins et al. |
| 2003/0129354 A1 | 7/2003 | Burke et al. |
| 2003/0170420 A1 | 9/2003 | Higgins et al. |
| 2003/0194546 A1 | 10/2003 | McCabe |
| 2003/0203152 A1 | 10/2003 | Higgins et al. |
| 2003/0203153 A1 | 10/2003 | Jones |
| 2003/0220039 A1 | 11/2003 | Chen et al. |
| 2004/0048036 A1 | 3/2004 | Nakasuji et al. |
| 2004/0062903 A1 | 4/2004 | Evans et al. |
| 2004/0077247 A1 | 4/2004 | Schmidt et al. |
| 2004/0176003 A1 | 9/2004 | Yang et al. |
| 2004/0191469 A1 | 9/2004 | Brodeur et al. |
| 2004/0224589 A1 | 11/2004 | Bacon et al. |
| 2005/0019539 A1 | 1/2005 | Pike |
| 2005/0199755 A1 | 9/2005 | Sumida et al. |
| 2005/0212166 A1 | 9/2005 | Seo et al. |
| 2005/0260913 A1 | 11/2005 | Doesburg |
| 2005/0287334 A1 | 12/2005 | Wright et al. |
| 2006/0001187 A1 | 1/2006 | Allen, III et al. |
| 2006/0032175 A1 | 2/2006 | Chen et al. |
| 2006/0035990 A1 | 2/2006 | Hennington et al. |
| 2006/0068188 A1 | 3/2006 | Morse et al. |
| 2006/0106124 A1 * | 5/2006 | Fink et al. ..................... 521/172 |
| 2006/0125158 A1 | 6/2006 | Rouanet et al. |
| 2006/0199454 A1 | 9/2006 | Blanpied et al. |
| 2006/0225952 A1 | 10/2006 | Takayasu et al. |
| 2006/0280902 A1 | 12/2006 | Otteson et al. |
| 2007/0039268 A1 | 2/2007 | Ambrose, Jr. et al. |
| 2007/0043128 A1 | 2/2007 | Jenkines et al. |
| 2007/0066174 A1 | 3/2007 | Bacon |
| 2007/0087160 A1 | 4/2007 | Wright |
| 2007/0116991 A1 | 5/2007 | Balthes et al. |
| 2007/0218260 A1 | 9/2007 | Miclo et al. |
| 2007/0256970 A1 | 11/2007 | DiLeo et al. |
| 2007/0275207 A1 | 11/2007 | Higgins et al. |
| 2007/0286982 A1 | 12/2007 | Higgins et al. |
| 2008/0008862 A1 | 1/2008 | Ogle et al. |
| 2008/0050577 A1 | 2/2008 | Gilder et al. |
| 2008/0063875 A1 | 3/2008 | Robinson et al. |
| 2008/0075915 A1 | 3/2008 | Wening et al. |
| 2008/0098935 A1 | 5/2008 | Roth et al. |
| 2008/0124533 A1 | 5/2008 | Bouckaert et al. |
| 2010/0267304 A1 | 10/2010 | Fowler |

FOREIGN PATENT DOCUMENTS

| | | |
|---|---|---|
| EP | 0312090 A2 | 4/1989 |
| EP | 0387340 A1 | 9/1990 |
| EP | 0642894 A1 | 3/1995 |
| EP | 0646452 A2 | 4/1995 |
| EP | 0695730 A2 | 2/1996 |
| EP | 0719301 A1 | 7/1996 |
| EP | 0776741 A1 | 6/1997 |
| EP | 0818304 A2 | 1/1998 |
| EP | 1042106 A1 | 10/2000 |
| EP | 1272701 A2 | 1/2003 |
| JP | 2002067257 A | 3/2002 |
| JP | 2004100337 A | 4/2004 |
| WO | WO-9109725 A1 | 7/1991 |
| WO | WO-9852730 A1 | 11/1998 |
| WO | WO-02053815 A1 | 7/2002 |
| WO | WO-03008701 A1 | 1/2003 |
| WO | WO-03106761 A1 | 12/2003 |
| WO | WO-2004053222 A2 | 6/2004 |
| WO | WO-2005033410 A2 | 4/2005 |
| WO | WO-2005042136 A2 | 5/2005 |
| WO | WO-2006058093 A1 | 6/2006 |
| WO | WO-2006107847 A2 | 10/2006 |
| WO | WO-2006127080 A1 | 11/2006 |
| WO | WO-2007049973 A2 | 5/2007 |
| WO | WO-2007095730 A1 | 8/2007 |
| WO | WO-2007146282 A1 | 12/2007 |

(56) References Cited

FOREIGN PATENT DOCUMENTS

OTHER PUBLICATIONS

Non-Final Office Action issued on Jan. 1, 2015 by the United States Patent and Trademark Office for U.S. Appl. No. 12/786,047, filed May 24, 2010 (Inventor—Rees; Applicant—Columbia Insurance Co.) (9 pages).
Response to Final Office Action filed on Dec. 8, 2014 with the United States Patent and Trademark Office for U.S. Appl. No. 12/786,047, filed May 24, 2010 (Inventor—Rees; Applicant—Columbia Insurance Co.) (10 pages).
Notice of Appeal filed on May 8, 2014 with the United States Patent and Trademark Office for U.S. Appl. No. 12/786,047, filed May 24, 2010 (Inventor—Rees; Applicant—Columbia Insurance Co.) (2 pages).
Final Office Action issued on Nov. 8, 2013 by the United States Patent and Trademark Office for U.S. Appl. No. 12/786,047, filed May 24, 2010 (Inventor—Rees; Applicant—Columbia Insurance Co.) (9 pages).
Response to Non-Final Office Action filed on Aug. 15, 2013 with the United States Patent and Trademark Office for U.S. Appl. No. 12/786,047, filed May 24, 2010 (Inventor—Rees; Applicant—Columbia Insurance Co.) (8 pages).
Non-Final Office Action issued Feb. 15, 2013 by the United States Patent and Trademark Office for U.S. Appl. No. 12/786,047, filed May 24, 2010 (Inventor—Rees, et al.; Applicant—Columbia Insurance Co.) (9 pages).
Response to Restriction Requirement filed Jan. 25, 2013 to the United States Patent and Trademark Office for U.S. Appl. No. 12/786,047, filed May 24, 2010 (Inventor—Rees, et al.; Applicant—Columbia Insurance Co.) (2 pages).
Requirement for Restriction/Election issued Sep. 25, 2012 by the United States Patent and Trademark Office for U.S. Appl. No. 12/786,047, filed May 24, 2010 (Applicant—Columbia Insurance Co.) Inventor—Rees, et al.) (7 pages).
Notice of Appeal filed on Apr. 8, 2015 with the United States Patent and Trademark Office for U.S. Appl. No. 12/786,036, filed May 24, 2010 (Inventor—Rees; Applicant—Columbia Insurance Co.) (2 pages).
Final Office Action issued on Oct. 8, 2014 by the United States Patent and Trademark Office for U.S. Appl. No. 12/786,036, filed May 24, 2010 (Inventor—Rees; Applicant—Columbia Insurance Co.) (30 pages).
Response to Non-Final Office Action filed on Aug. 27, 2014 with the United States Patent and Trademark Office for U.S. Appl. No. 12/786,036, filed May 24, 2010 (Inventor—Rees; Applicant—Columbia Insurance Co.) (17 pages).)
Non-Final Office Action issued on Feb. 27, 2014 by the United States Patent and Trademark Office for U.S. Appl. No. 12/786,036, filed May 24, 2010 (Inventor—Rees; Applicant—Columbia Insurance Co.) (26 pages).
Response to Final Office Action filed on Feb. 11, 2014 with the United States Patent and Trademark Office for U.S. Appl. No. 12/786,036, filed May 24, 2010 (Inventor—Rees; Applicant—Columbia Insurance Co.) (16 pages).
Notice of Appeal filed on Oct. 10, 2013 with the United States Patent and Trademark Office for U.S. Appl. No. 12/786,036, filed May 24, 2010 (Inventor—Rees; Applicant—Columbia Insurance Co.) (2 pages).
Final Office Action issued on Apr. 11, 2013 by the United States Patent and Trademark Office for U.S. Appl. No. 12/786,036, filed May 24, 2010 (Inventor—Rees; Applicant—Columbia Insurance Co.) (17 pages).
Response to Non-Final Office Action filed Mar. 26, 2013 with the United States Patent and Trademark Office for U.S. Appl. No. 12/786,036, filed May 24, 2010 (Inventor—Rees; Applicant—Columbia Insurance Co.) (15 pages).
Non-Final Office Action issued Sep. 26, 2012 by the United States Patent and Trademark Office for U.S. Appl. No. 12/786,036, filed May 24, 2010 (Inventor—Rees, et al.; Applicant—Columbia Insurance Co.) (9 pages).
Response to Restriction Requirement filed Aug. 28, 2012 to the United States Patent and Trademark Office for U.S. Appl. No. 12/786,036, filed May 24, 2010 (Inventor—Rees et al.; Applicant—Columbia Insurance Co.) (2 pages).
Requirement for Restriction/Election issued Jun. 28, 2012 by the United States Patent and Trademark Office for U.S. Appl. No. 12/786,036, filed May 24, 2010 (Inventor—Rees et al.; Applicant—Columbia Insurance Co.) (7 pages).
U.S. Appl. No. 12/786,036, filed May 24, 2010, Rees et al.
U.S. Appl. No. 12/786,047, filed May 24, 2010, Rees et al.
Non-Final Rejection issued on Nov. 16, 2015 by the United States Patent and Trademark Office for U.S. Appl. No. 12/786,047, filed May 24, 2010 (Applicant—Columbia Insurance Co. // Inventor—Rees, et al.) (7 pages).
Non-Final Office Action issued on Aug. 27, 2015 by the United States Patent and Trademark Office for U.S. Appl. No. 12/786,036, filed May 24, 2010 (Inventor—Rees; Applicant—Columbia Insurance Co.) (12 pages).
Final Rejection issued on Mar. 24, 2016 by the United States Patent and Trademark Office for U.S. Appl. No. 12/786,036, filed May 24, 2010 (Applicant—Columbia Insurance Co.//Inventor—Rees, et al.) (7 pages).

\* cited by examiner

REBOND POLYURETHANE FOAM COMPRISING RECLAIMED CARPET MATERIAL AND METHODS FOR THE MANUFACTURE OF SAME

CROSS-REFERENCE TO RELATED APPLICATIONS

The present invention claims the benefit of priority to U.S. Provisional Patent Application Ser. No. 61/180,706, filed May 22, 2009, the entire disclosure of which is incorporated by reference herein for all purposes.

FIELD OF THE INVENTION

The present invention relates generally to polyurethane foam compositions and, more particularly to rebonded polyurethane foam compositions comprising reclaimed carpet material as a filler therein. Also provided are methods and systems for the manufacture of the polyurethane foams disclosed and described herein.

BACKGROUND OF THE INVENTION

Carpet is a common floor covering used in many businesses and residences. While well-made carpet is generally versatile and long-lasting, carpet waste nonetheless represents a growing concern in both private industry and governments. Carpet waste can include, for example, post consumer carpet, including commercial, industrial and residential waste carpet; manufacturing remnants; quality control failures, and the like. Waste carpet can be used carpet, e.g., carpet removed from an apartment complex, or unused carpet, e.g., residual carpet left from an installation or manufacturing process.

Unfortunately, the vast majority of current carpet waste is sent to landfills for disposal. While most estimates indicate that carpet waste constitutes only 1 to 2% of all municipal solid waste, this amount still represents a vast quantity of waste that can have a substantial economic and environmental impact. As a result, many in the industry have turned to carpet recycling as a solution to carpet waste. Recycling carpet, however, is difficult because its major components are chemically and physically diverse. Most carpets comprise about 20-50 weight percent face fiber, the remainder being backing materials, commonly polypropylene, and an adhesive which attaches the carpet fiber to the backing material. The adhesive typically comprises a carboxylated styrene-butadiene (XSB) latex copolymer, and an inorganic filler such as calcium carbonate.

Most carpet recycling methods to date have focused on recycling certain environmentally malignant constituents of carpet. Examples include polymers, such as nylon, and adhesive constituents found in waste carpet. However, little attention has been devoted to the various other constituents of carpet, such as inorganic filler. While such constituents may not present a direct environmental harm, they nonetheless represent a potential cost savings and a reduction in landfilling burden. If such materials could be reclaimed and recycled, the supply of such materials could be augmented, thereby reducing the burden to manufacture new materials. In addition, such broad-based recycling methods can also potentially help to comport with National Sanitation Foundation (NSF) 140/2007 recommendations, which encourage carpet industries to develop sustainable carpet manufacturing and recycling programs for social, economic, and environmental benefits. Accordingly, there is a need to provide improved methods and systems for recycling one or more component parts of carpet.

Rebond foam or rebond polyurethane foam is known in the art of isocyanate-based polymeric foams. Specifically, it is known to mix pre-formed pieces or chunks of foam with a binder component that serves to bond the pre-formed foam pieces to one another. This so-called "rebonding" technology has been used for a number of years as a means for recycling waste polyurethane foams. Due to their relative high density and excellent resilience, rebond foams are suitable for applications including vibration sound dampening, flooring, sport mats, cushioning, packaging and carpet underlay. In fact, it is estimated that hundreds of thousands of tons of rebonded foam are produced each year.

The following invention is therefore based upon the unexpected discovery that various reclaimed carpet materials can be incorporated into these conventional rebond polyurethane foams as a filler. As discussed in greater detail below, the presence of reclaimed carpet material as a filler in conventional rebond polyurethane foams can improve dimensional stability, while replacing more expensive materials commonly used to manufacture first generation rebond. Moreover, this can be achieved without sacrificing the desirable performance properties of conventional rebond foam, including for example plushness or softness, dimensional stability, and tear resistance of the foam. Still further, due to the significant quantities of rebond foam manufactured yearly, the present invention also provides an improved method for recycling carpet material that avoids the cost and environmental impact associated with sending carpet waste to landfills.

SUMMARY OF THE INVENTION

In one aspect, the present invention generally provides rebond polyurethane foam comprising a matrix of particles or chunks of flexible polyurethane foam and reclaimed carpet material distributed within the matrix of foam particles.

In another aspect, the present invention also provides a method for manufacturing the rebond polyurethane foam disclosed herein. The method generally comprises mixing reclaimed carpet material with pre-formed particles or chunks of flexible polyurethane foam, and then mixing the admixture of pre-formed foam particles and reclaimed carpet material with a binder component. The mixture of foam particles, reclaimed carpet material, and binder is thereafter compressed to obtain a desired product density and the binder is cured with heat and/or steam to provide a re-bond polyurethane foam.

Additional aspects of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION OF THE INVENTION

The present invention can be understood more readily by reference to the following detailed description, examples, drawing, and claims, and their previous and following description. However, before the present articles, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "reclaimed carpet material" can include two or more reclaimed carpet materials unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As summarized above, the present invention provides a re-bond polyurethane foam structure that can be obtained by mixing reclaimed carpet material with pre-formed particles or chunks of flexible polyurethane foam, and then mixing the admixture of pre-formed foam particles and reclaimed carpet material with a binder component. The mixture of foam particles, reclaimed carpet material, and binder is thereafter compressed to obtain a desired product density and the binder is cured with heat and/or steam to provide a re-bond polyurethane foam structure comprising a matrix of particles or chunks of flexible polyurethane foam and the reclaimed carpet material distributed within the matrix of foam particles or chunk. In aspects where steam is used to cure the binder component, water may be added to the mixture before heating to generate steam upon heating, or steam may be applied directly to the compressed mixture.

The pre-formed polyurethane foam particles or chunks can be obtained from any conventionally known source typically used in the manufacture of rebond foam, including waste material such as crust, scraps, production trimmings, or quality control failures which are a result of foam manufacturing processes. Suitable foam particles or chunks can also be obtained from collected post consumer foam waste. What ever the source of foam may be, conventional equipment such as granulators and flock-mills can be used to chop, shred, or chip the source foam into chunks or pieces having the desired size characteristics. There are other conventionally known technologies available to handle large foam pieces by first cutting them into very thin strips, which can then be reduced into smaller pieces. To that end, it should be understood that the quality of a formed rebond product can depend in part on the type and grade of foam used as well as the particle size and uniformity of the foam pieces. As such, the foam particles or chunks suitable for use in the present invention can have any desired size particle size and degree of uniformity. For example, in some aspects, it is preferred that the foam particles are chopped or shredded to a substantially uniform particle size in the range of about one-quarter to one-half inch in diameter. Alternatively, in other aspects, it is preferred for the foam particles to be chopped or shredded such that the particle size among a population of foam particles is substantially non-uniform.

The reclaimed carpet material to be mixed with the polyurethane foam particles or chunks can include fibrous material reclaimed from post consumer carpet (PCC). The post consumer carpet can be post commercial, post residential carpet, post industrial carpet, or any combination thereof. Additionally, the reclaimed carpet material can comprise pre-consumer fibrous materials including for example, manufacturing remnants and quality control failures. By incorporating PCC into the rebond foam pad several advantages can be realized. For example, second generation products incorporating the PCC have less of an environmental footprint relative to traditional fiber pads comprising only virgin materials. The use of PCC can also reduce the amount of traditional, often environmentally harmful materials that previously were sent to landfills, while still providing the same or similar level of fiber pad performance. Additionally, substitution of conventional rebond foam material with PCC material can reduce the manufacturing costs associated with producing fiber pads. Still further, the incorporation of PCC material into a second generation fiber pad can also provide mechanical reinforcement or stability to the second generation fiber pad.

Suitable PCC material for incorporating into the rebond product can comprise fibers of one or more thermoplastic polymers, such as fibers of nylon 6/6, nylon 6, polyester, polypropylene, polyethylene, polyurethane, polyvinyl chloride, polyethylene terephthalate, polytrimethylene terephthalate, latex, styrene butadiene rubber, or any combination thereof. In one aspect, the PCC material comprises foam waste. In another aspect, the PCC material does not comprise foam waste. Additionally, the PCC material can comprise natural fibers, such as wool, cotton, or jute. PCC material comprising synthetic and/or natural materials described above can optionally be present as a fiber. The PCC material can also comprise fillers. The fillers can be any suitable filler, including, for example, aluminum oxide trihydrate (alumina), calcium carbonate, barium sulfate or mixtures thereof. The fillers can be virgin, waste material, or even reclaimed fillers.

The PCC material can be obtained from various component parts of prior manufactured carpet products, for example, and without limitation, a face layer, an adhesive layer, a backing layer, a secondary backing layer, an underlayment, a cushioning material, or a scrim. To that end, the PCC material can be obtained from a variety of sources. In one example, the PCC material can be obtained from a collection site. Approximately 50 collection sites are spread around the United States. These collection sites take in PCC which is then shipped to a facility for sorting by fiber type. Once sorted, baled material of the same fiber type is then shipped to a secondary location where various techniques are employed for reducing the large pieces of carpet to small chunks or shredded fiber to provide an amalgamated mixture. The amalgamated mixture will typically contain face fiber, primary backing, secondary backing, carpet binder and, in some cases, attached cushion. After this stage, the product can be used with or without further refinement or processing to remove additional contaminates.

Dependant on the desired properties and cost of the resulting rebond product, the PCC material can be mixed with the foam particles as a relatively coarse blend of ground/shredded PCC or a more refined material containing primarily opened carpet face fibers. For example, in some aspects, the PCC material to be mixed with the foam particles can comprise relatively coarse slit tape fibers obtained from primary and secondary carpet backing materials. These relatively coarse materials or fibers can be used to provide a low-cost structural material that can serve as reinforcement for the rebond foam product. In other aspects, further processing of PCC material can be desirable. For example, the PCC material can be chopped or sheared into fiber or tape yarn lengths of any desired length, including for example, fiber lengths of from about 1/64 inch to about 1/2 inch. In some aspects, the PCC material can have a substantially uniform linear fiber density. Alternatively, in other aspects, the PCC material can have a substantially non-uniform linear fiber density. Similarly, in some aspects, the PCC material can have a substantially uniform fiber length. Alternatively, in other aspects, the PCC material can have a substantially non-uniform fiber length.

In addition to fibrous reclaimed carpet material described above, it should be appreciated that reclaimed carpet material can further comprise one or more impurities. For example, representative impurities that can be present in reclaimed carpet material and thus present in the articles described herein include dirt, sand, oil, inorganic filler, and other conventionally known waste materials that can be present in reclaimed carpet material.

The amount of reclaimed carpet material relative to the amount of polyurethane foam particles can be adjusted to any desired level, again depending on the desired properties of the resulting re-bond foam product. For example, in some aspects, for each 100 parts by weight of combined reclaimed carpet material and foam particles, the reclaimed carpet material can comprise from about 1 to about 70 parts by weight or from about 1 weight percent to about 70 weight percent of the mixture. In accordance with these aspects, the reclaimed carpet material can comprise such exemplary amounts as about 5 parts, 10 parts, 15 parts, 20 parts, 25 parts, 30 parts, 35 parts, 40 parts, 45 parts, 50 parts, 55 parts, 60 parts, or 65 parts by weight of the mixture. In still further aspects, the reclaimed carpet material can be present in an amount within any range derived from the above values. For example, the reclaimed carpet material can be present in an amount relative to the foam particles that is in the range of from 1 to about 50 parts by weight, 5 to 25 parts by weight, or even 10 to 20 parts by weight of the combined reclaimed carpet material and foam particle mixture.

In one aspect, a feedstock source for the rebond polyurethane pad is shredded "hull" or carpet remnants left over from a shearing operation. Such hull has limited value since most of the face fiber has been removed and is usually sent to the landfill or a Waste-To-Energy program. To increase the fibrous content in the polyurethane pad, the shredded hull can be blended with higher fiber content substrates such as trim waste left over from the shearing preparation phase of flat rectangular feedstock or by combining the hull with shredded post industrial salvage trim waste. Other materials could also be used to increase the fiber content.

The above described mixture of foam particles and reclaimed carpet material is then mixed with a suitable binder composition which coats at least a portion of the foam particles such that, when activated and cured, it binds the foam particles together to form a matrix of foam particles having the reclaimed carpet material distributed therein the matrix. The binder composition can be any conventionally known binder composition suitable for use in forming rebonded polyurethane foam, including those disclosed and described in U.S. Pat. Nos. 5,290,818; 5,312,888; 5,817,703; 5,880,165; and 6,136,870, the entire disclosures of which are incorporated by reference herein.

In some aspects, it is desirable to select a binder composition that is compatible with the chemical composition of the polyurethane foam particles themselves. To that end, conventionally known polyurethane foams are typically prepared by reacting, in the presence of a blowing agent, polyisocyanates with a high molecular weight polyol. Catalysts, such as organo-tin compounds and tertiary amines, and emulsifiers such as silicone oils may also be incorporated into the reaction mixture to control reaction rate, cell size and porosity. Thus, an exemplary binder composition suitable for use in forming a rebond foam from similarly formed polyurethane foam particles can also comprise a polyisocyanate prepolymer having isocyanate functionality and a catalyst.

U.S. Pat. No. 6,136,870, the entire disclosure of which is incorporated by reference here, discloses specific exemplary isocyanate prepolymers that are suitable for use as binders in the present invention. As disclosed therein, a prepolymer binder can be formed by reacting a liquid polyether or polyester polyol, or mixture of polyols, with an excess of isocyanate, or mixture of isocyanates, optionally in the presence of one or more catalysts, surfactants and extenders. Polyols are generally categorized as polyether polyols or polyester polyols. Polyether polyols are conventionally oxides, such as ethylene oxide or propylene oxide, polymerized onto an active hydrogen compound such as ethylene glycol, propylene glycol, glycerol and so forth. Polyester polyols are conventionally polycondensation products of polyhydric acids, such as adipic acid, maleic acid or phathalic acid, with polyhydroxy compounds, such as ethylene glycol, propylene glycol, glycerol and so forth. In a specific exemplary aspect, a suitable polyol includes a 3000 molecular weight polyether triol, such as VORANOL 3010 made by Dow Chemical.

Suitable isocyanates include TDI (tolylene diisocyanate) or MDI (diphenylmethane diisocyanate), or PMDI (polymeric MDI or diphenylmethane diisocyanate containing methylene bisphenyl isocyanate and/or polymethylene polyphenyl isocyanate), or mixtures of TDI and MDI, or MDI and PMDI, or TDI and MDI and PMDI. A suitable polymeric MDI (PMDI) is LUPRINATE M20S from BASF Corp. In a specific exemplary aspect, a suitable isocyanate can included VORANATE T-80 TDI made by Dow Chemical.

As one of ordinary skill in the art will appreciate, the amount of binder to be mixed with the combined foam particles and reclaimed carpet material will depend, in part, upon the specific composition of the foam particles, the reclaimed carpet material, and the desired physical performance properties of the binder itself. Additionally, the amount of binder can be adjusted depending on the amount of reclaimed carpet material relative to the foam particles. Still further, the amount of binder can also be adjusted relative to the amount foam particles depending on the desired performance properties of the resulting rebond foam. To that end, it should be understand that optimization of the amount of binder based upon the aforesaid variables will be readily obtainable by one of ordinary skill in the art without the need for undue experimentation.

According to some aspects however, it is contemplated that each 100 parts by weight of the combined reclaimed carpet material and foam particles can be mixed with from about 5 parts to 35 parts by weight of a binder component, including further exemplary amounts as about 10 parts, 15 parts, 20 parts, 25 parts, and 30 parts by weight. In still further aspects, the binder can be present in an amount within any range derived from the above values. For example, for every 100 parts by weight of the combined reclaimed carpet material and foam particles, the binder can be present in an amount that is in the range of from 5 to about 30 parts by weight, from 10 to 25 parts by weight, or even 10 to 20 parts by weight. It should be understood that, depending on the physical characteristics and chemical composition of the reclaimed carpet material, as the amount of reclaimed carpet material to be mixed with foam particles is increased it may also be desirable for the relative amount of prepolymer binder to be proportionately increased.

The mixture of foam particles, reclaimed carpet material, and binder is thereafter compressed to obtain a desired product density and the binder is cured with heat and/or steam to provide a re-bond polyurethane foam structure comprising a matrix of particles or chunks of flexible polyurethane foam and the reclaimed carpet material distributed within the matrix of foam particles.

Figure 1:
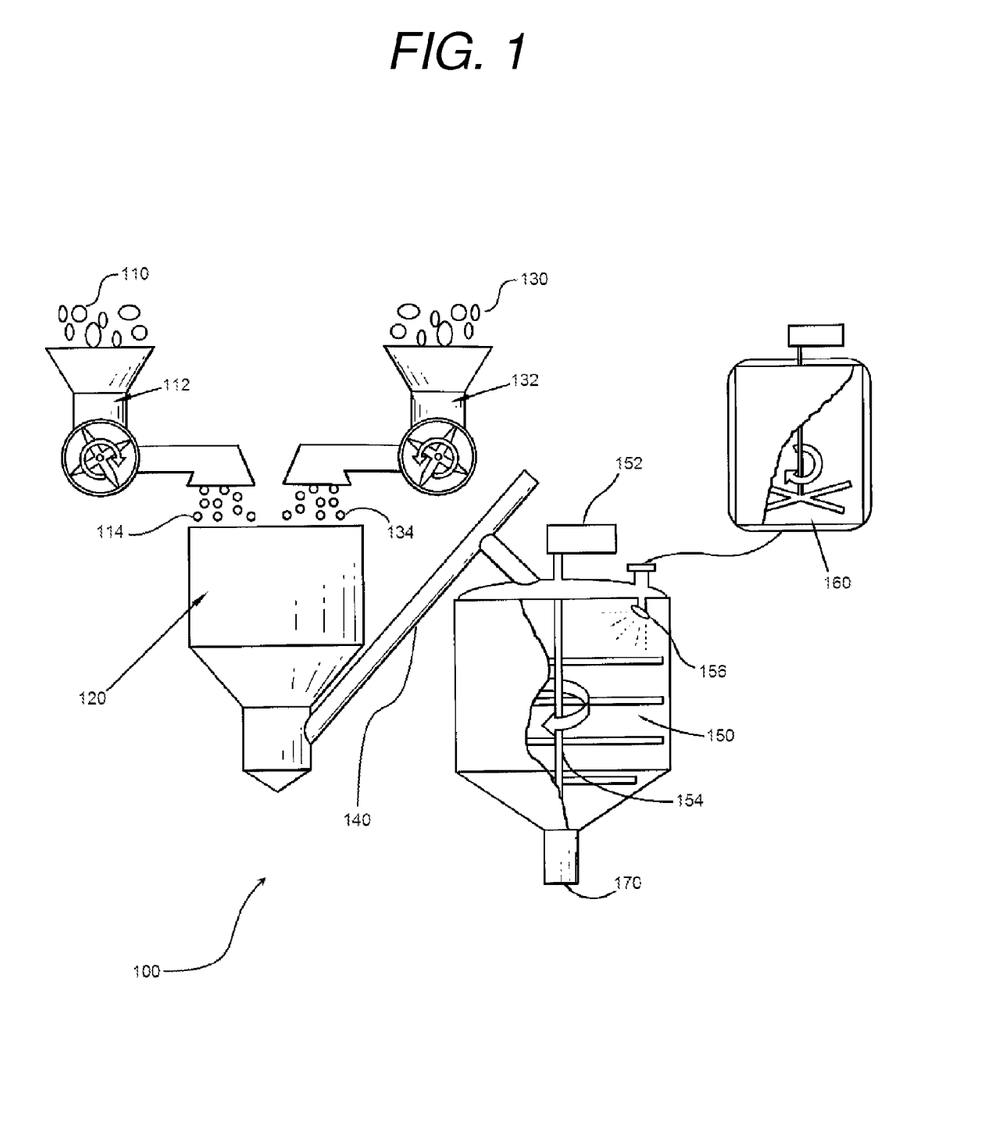
FIG. 1 is a schematic illustration of a process and apparatus for forming a rebond precursor or slurry of polyurethane foam particles, reclaimed carpet material and liquid binder.

With reference to FIG. 1 an exemplary process and system for manufacturing a rebond polyurethane foam precursor slurry is schematically shown. In particular, FIG. 1 illustrates a system 100 for forming a rebond precursor slurry comprising a mixture of polyurethane foam particles, reclaimed carpet material, and liquid binder. Polyurethane foam particles are formed by a process of shredding or grinding foam materials 110 such as foam scrap or waste in a foam shredder 112 to form foam particles or chunks 114 which are subsequently fed to one or more storage hoppers 120 (different densities, colors, or types of foam particles can be stored in multiple respective hoppers not shown). Similarly, reclaimed carpet material such as post consumer carpet is provided by a process of shredding or grinding carpet remnants 130 in a post consumer carpet shredder 132 to form post consumer carpet 134. The post consumer carpet remnants 134 are similarly fed in the desired amount to one or more storage hoppers 120 to be admixed with polyurethane foam particles. The combined mixture of reclaimed foam particles and reclaimed carpet material are then fed from the storage hopper 120 by a transfer system 140 to a blend tank 150 wherein the combined mixture of polyurethane foam particles and reclaimed carpet material are blended and mixed with one or more liquid prepolymer binders from one or more prepolymer preparation reactors 160 reactors or tanks to form a blended, mixed, slurry 170.

The prepolymer liquid binder can be introduced into the tank by any conventional means, including for example a spray nozzle 156 as shown. The blend tank 150 is driven by a conventional drive mechanism 152 which drives an agitator 154 housed within the tank and which rotates within the tank during formation of the slurry 170.

Figure 2:
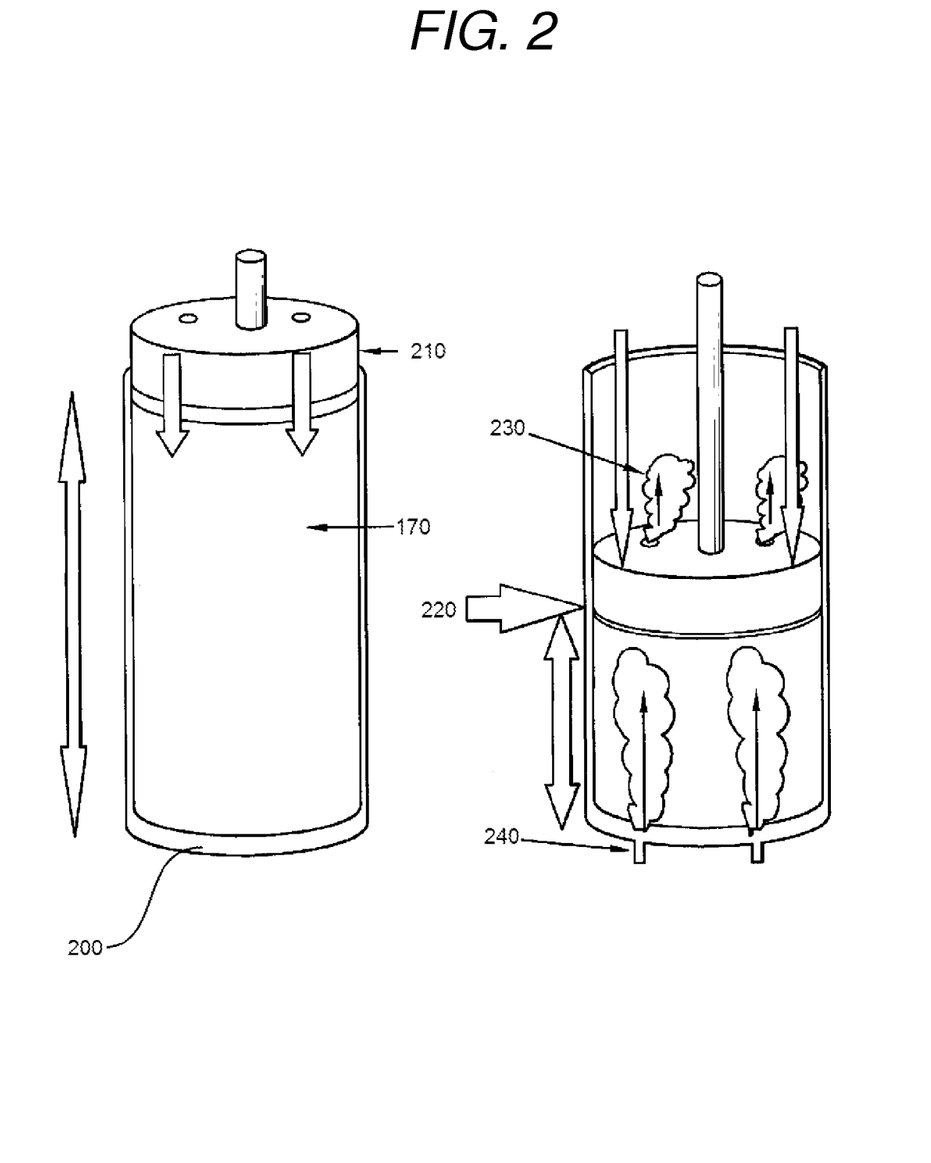
FIG. 2 is a schematic illustration of an exemplary batchwise production of a rebond foam block or log from the slurry of FIG. 1.
Figure 3:
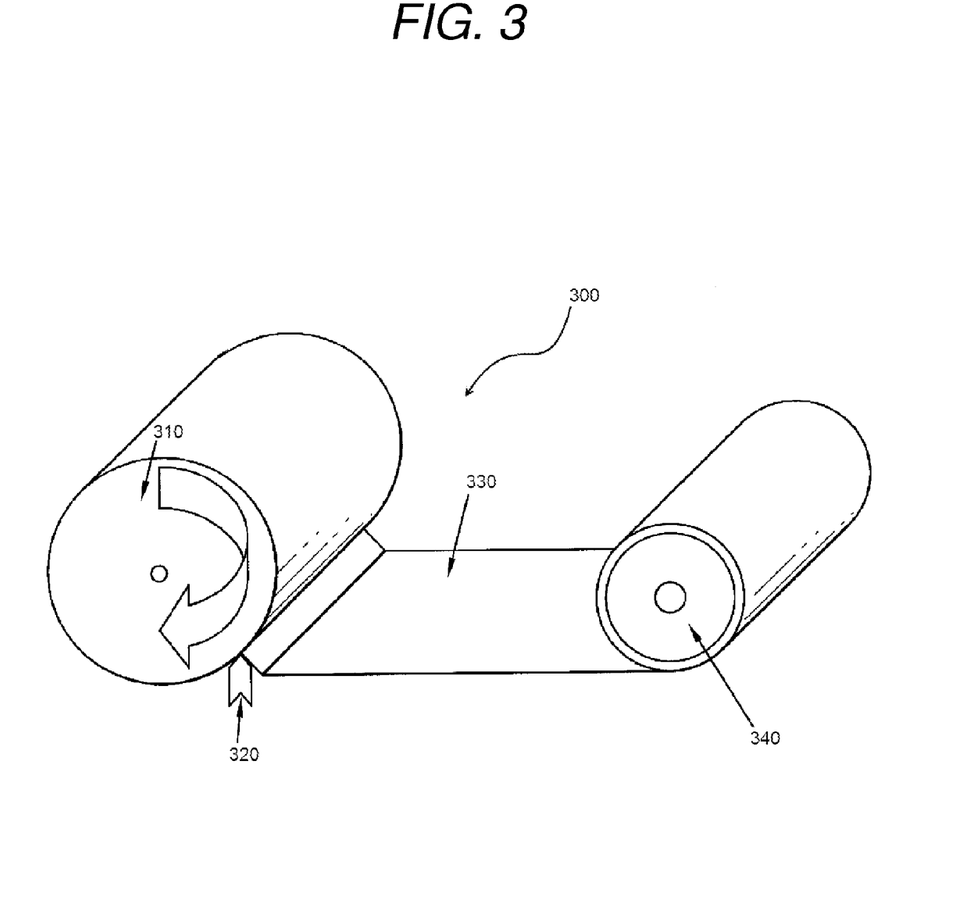
FIG. 3 is a schematic illustration of the production of a rebond foam sheet or layer in from the rebond foam block or log of FIG. 2.

The slurry produced as exemplified in FIG. 1 can be conveyed to a subsequent processing unit configured to compress and cure the slurry to form a rebonded polyurethane foam according to a batchwise process. For example, as illustrated in FIG. 2, the slurry 170 is fed to a large compression cylinder or vessel 200, is compressed by a hydraulic ram 210 to a predetermined compression ratio 220 selected to provide a desired rebond foam density, and subsequently treated with heat and steam 230 introduced from a steam jacket 240 to set or cure the rebond foam in its compressed state (compressed particle foam). As shown in FIG. 3, after cooling, the resulting rebond foam log or block 310 can be removed from the cylinder and mounted in a peeling or slicing apparatus 300 having a band knife or other blade or device 320 for cutting, slitting or peeling a rebond foam sheet 330 or pad from the exterior of the log or roll. The cut sheet 330 can subsequently be packaged as a roll good 340 for further storage or shipping.

Figure 4:
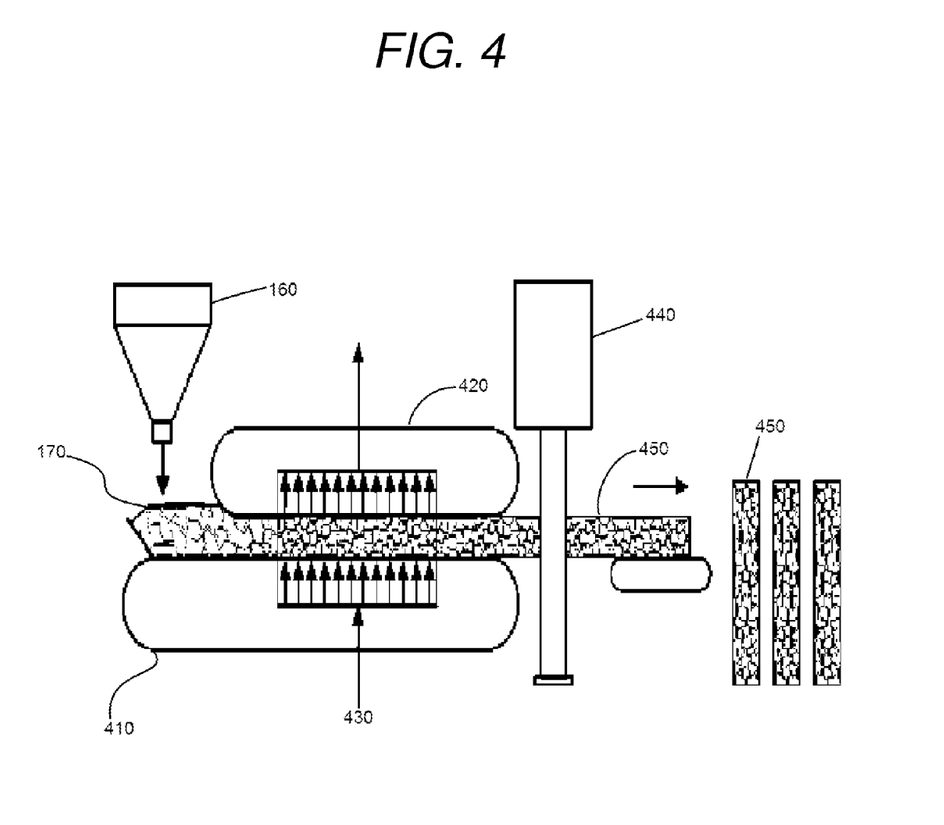
FIG. 4 is a schematic illustration of an exemplary continuous production of a rebond foam block or log from the slurry of FIG. 1.

In an alternative aspect, the slurry produced as exemplified in FIG. 1 can also be conveyed to a subsequent processing unit configured to compress and cure the slurry to form a rebonded polyurethane foam in a continuous process. For example, as illustrated in FIG. 4, the slurry 170 is deposited from the blend tank onto a moving conveyor press comprising a bottom conveyor 410 and top conveyor 420. The top conveyor is positioned a predetermined distance above bottom conveyor so that the slurry mixture is compressed to the desired compression ratio as it passes between them. As the slurry material passes between the two conveyors, the slurry can also be heat treated with steam 430 to set and cure the rebond foam in its compressed state. As the compressed rebond foam continuously exits the conveyor press the rebond foam can pass through a cutting station 440 to be cut into blocks 450. As with the previous batchwise process, blocks 450 can be further processed by conventional slicing or cutting to provide a finished sheet of rebond having any desired size and shape configurations.

The rebond polyurethane foams of the present invention can be manufactured having any desired volumetric density. For example, the rebond foam can have a volumetric density in the range of from 1 to 50 pounds per cubic foot, including additional exemplary ranges of 1 to 25 pounds per cubic foot, 3 to 22 pounds per cubic foot, 6 to 13 lbs per cubic foot, and 8 to 12 lbs. per cubic foot. Similarly, rebond foam sheets can be manufactured having any desired thickness, including for example, thicknesses in the range of from 0.25 inches to 1.0 inches, including exemplary thickness of ⅜ inch, ½ inch, 7/16 inch, ⅝ inch, and ¾ inch. In alternative aspects, the rebond foam can be manufactured having thicknesses greater than 1.0 inches, greater than 2.0 inches, greater than 3.0 inches, greater than 4.0 inches, greater than 5.0 inches, or even greater than 6.0 inches.

In still further aspects of the invention, the method of manufacturing the rebonded foam can optionally comprise a sanitization step. As one of skill in the art will appreciate, the presence of impurities in reclaimed carpet material can necessitate a need to sanitize the reclaimed materials for health and safety purposes. To that end, the reclaimed carpet material can be subjected to a sanitization step at any point during the manufacture of the a rebond foam including, for example, sanitizing the reclaimed carpet material prior to blending with the foam particles or alternatively by sanitizing the reclaimed carpet material after blending with the foam particles. In those aspects where steam is used to cure and set the binder component, the steam can also be effective for sanitizing the reclaimed carpet material as well.

A rebond foam sheet as described herein can optionally undergo further processing to provide one or more additional features depending upon the desired end use application. For example, it is contemplated that a face or top layer can be applied to either the top surface, the bottom surface, or both top and bottom surfaces of a formed rebond foam sheet. The additional face layer can be, for example and without limitation, a non-woven fabric, a non-woven scrim, a non-woven fiber layer, thermoplastic open mesh, netting, film, adhesive film, impregnated low-melt powder, impregnated low-melt fiber, a needle punched fabric, a tufted carpet, or any combination thereof. The face layer can itself comprise any desired amount of reclaimed carpet material as described herein. As one having ordinary skill in the pertinent art will appreciate, the addition of the face layer can improve the dimensional stability and tear strength of the foam pad. The increase in tensile strength resulting from the addition of the face layer can also simplify the installation and handling of the foam pad while consistently maintaining the dimensions of the pad, thereby reducing stretching and thinning of the material. It is further contemplated that the face layer can more effectively distribute loads through the foam pad, thereby improving the compression resistance and compression-set physical properties of the pad. Still further, depending upon the particular material used, an optional face layer can also function as a dust resistant layer, a slip layer, or even a water-resistant or waterproof barrier between the foam pad and other elements, such as flooring.

The face layer can be heat-fused or singed with calendar rolls, belted presses, heated platens, air, or other means conventionally used in the pertinent art. It is also contemplated that the face layer can be fused to the desired top or bottom surface of the foam pad by using low-melt material already present in the face layer or, alternatively, by scattered low melt powders or spray adhesives as are conventionally used in the pertinent art.

Additionally, in a further aspect, the face layer secured thereto the foam pad can function as a slip surface. As one having ordinary skill in the pertinent art will appreciate, the presence of a top face layer and/or bottom face layer as described herein can enhance the slip characteristics of the foam pad by decreasing friction between the pad and adjacent surfaces. For example, the slip surface can be configured to have reduced frictional characteristics, thereby permitting a carpet to slide over the slip surface with minimal drag and reducing disruption of the foam pad.

It will be apparent that the addition of reclaimed carpet material into conventional rebond polyurethane foam can add dimensional stability, while replacing more expensive materials commonly used to manufacture first generation rebond. Moreover, this can be achieved without sacrificing the desirable performance properties of conventional rebond foam, including for example plushness or softness, dimensional stability, and tear resistance of the foam. As such, the rebond foams of the present invention are useful for several purposes. For example and without limitation, the rebond foam of the present invention can be used for such applications as packing foam, filler for structural voids, absorbent medium and the like. Still further, the rebond foams of the present invention are particularly useful in carpet and other floor covering pad applications.

EXAMPLES

To further illustrate principles of the present invention, the following examples are put forth so as to provide those of ordinary skill in the art with a further description of how various aspects of the invention disclosed herein can be made and/or evaluated. More specifically, in the following examples the durability of various rebond foam pads of the present invention were evaluated as a function of various performance properties, including for example, percentage of thickness lost. The results indicate that the various inventive rebond foam pads exhibit levels of durability equal to or exceeding that of conventional rebond foam pad materials. It should be understood however that these examples are intended to be purely exemplary of the invention and are not intended to limit the scope of what the inventors regard as their invention. Where applicable, efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric or full vacuum.

An exemplary rebond polyurethane foam pad was prepared as described herein comprising approximately 20% by weight post consumer carpet material. The pad was constructed to exhibit a volumetric density of approximately 8 pounds per cubic foot (pcf) and further had a top and bottom film layer for the purpose of water resistance and dust resistance. The exemplary rebond foam pad was then subjected to a battery of test to evaluate various performance properties.

First, the rebond foam pad was tested for dynamic fatigue pursuant to ASTM D 3574-03|4. Generally, for this test a portion of foam pad is placed on a wooded platen and a 60 pound roller is moved across the pad for 40,000 cycles. The measurement from the test is a loss of Indentation force deflection (IFD). The calculation is as follows: (original thickness−final thickness)×100/original thickness. The final number is therefore presented as a percentage. In other words the sample is measured for initial thickness, next compressed 25% of that thickness, and a force measurement is made then the sample is compressed to 65% of the original thickness, and the force measured. The samples are then subjected to the roller treatment for 40,000 cycles and the measurement process repeated. In addition to the force losses the overall thickness of the sample losses are also measured.

The results of the dynamic fatigue test indicated that the sample piece was 8.7 pounds per cubic foot with a thickness of $15/32$ of an inch. The final overall thickness loss was 8.130%. The loss at 25% IFD was 75.3% and the loss at 65% was 49.023%. These losses were consistent with additional conventional pads being tested at the same time. It was therefore evident that utilizing PCC as a filler in rebond foam pad did not sacrifice performance as measured by IFD loss and, in some case, out performed conventional foam pads.

A second battery of tests were performed using the Hexapod test, which is commonly used for testing carpet wear endurance. Generally, the Hexapod testing procedure measures the sample for thickness in three locations in the center line of the specimen. These locations are marked for future measurements. The piece is then placed in the drum with a cut of 18 oz cut pile carpet placed over the test piece. The drum is rotated for 4,000 cycles while a weighted knobby ball is rolling inside the drum to simulate foot traffic. The test piece is removed and measured for thickness in the marked areas. The process is repeated for 8,000 and 12,000 cycles. The results of the test measure the loss of thickness to be calculated as (original thickness−final thickness)×100/original thickness. The number is again presented as a percentage. The results of the Hexapod test indicate that after 4,000 cycles the thickness loss was 1.25%, after 8,000 cycles the thickness loss remained at 1.25% and after 12,000 cycles the final thickness loss was 2.3%. These results are again consistent with those of other conventional rebond foam pads.

A third test was run to evaluate whether the inventive rebond foam would o comply with the HUD requirements for compression set. The compression set of the test sample was evaluated pursuant to ASTM D3574 and provided a measured compression set value of 1.37%. This value exceeds the HUD requirement for rebond pad compression set where the maximum allowable compression set is 15%.

What is claimed is:

1. A rebond polyurethane foam, comprising:
   a plurality of preformed polyurethane foam particles bonded to one another to form a matrix; and
   reclaimed carpet material distributed within the matrix of polyurethane foam particles, wherein the reclaimed carpet material comprises a population of thermoplastic fibers having non-uniform linear fiber densities; and
   wherein the reclaimed carpet material is present in an amount of at least 35 parts by weight relative to the total amount of preformed polyurethane foam particles and reclaimed carpet material present in the rebond polyurethane foam.

2. The rebond polyurethane foam of claim 1, wherein the reclaimed carpet material is present in an amount of from 35 to 50 weight percent of the total weight of the rebond polyurethane foam.

3. The rebond polyurethane foam of claim 1, wherein the reclaimed carpet material comprises fibers of nylon 6, nylon 6,6, polyethylene, polypropylene, polyester, or any combination thereof.

4. The rebond polyurethane foam of claim 1, wherein the reclaimed carpet material comprises natural fibers.

5. The rebond polyurethane foam of claim 1, wherein the reclaimed carpet material comprises post consumer carpet material.

6. The rebond polyurethane foam of claim 1, having a volumetric density in the range of from 1 to 50 pounds per cubic foot.

7. The rebond polyurethane foam of claim 6, having a volumetric density in the range of from 1 to 25 pounds per cubic foot.

8. The rebond polyurethane foam of claim 1, having a volumetric density greater than 8 pounds per cubic foot.

9. The rebond polyurethane foam of claim 1, wherein the reclaimed carpet material is present in an amount of at least 50 parts by weight relative to the total amount of preformed polyurethane foam particles and reclaimed carpet material present in the rebond polyurethane foam.

* * * * *